Sept. 11, 1962     H. O. IRMSCHER     3,053,665
MANUFACTURE OF INFUSION BAGS
Filed Aug. 23, 1957     4 Sheets-Sheet 1
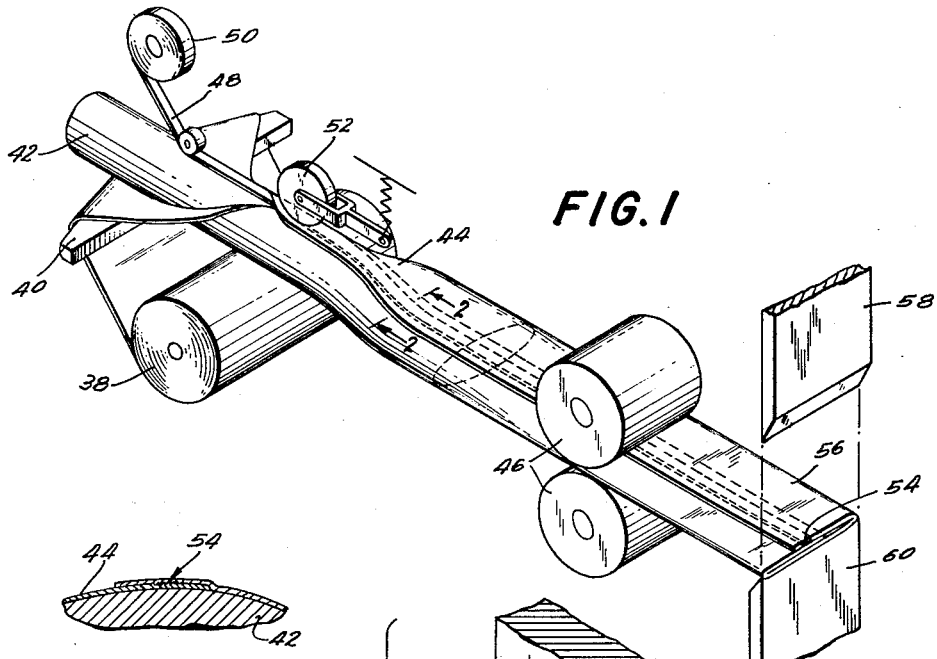
FIG. 1
FIG. 2
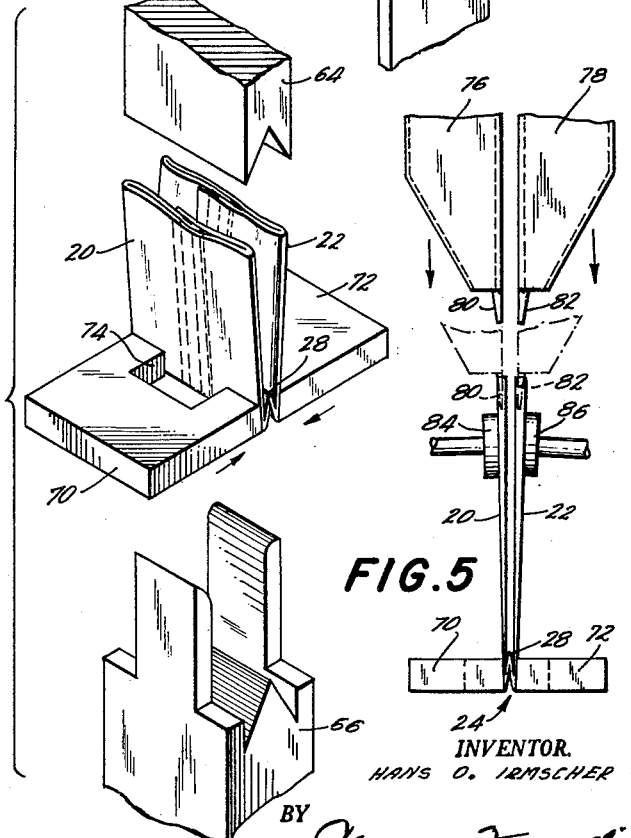
FIG. 5
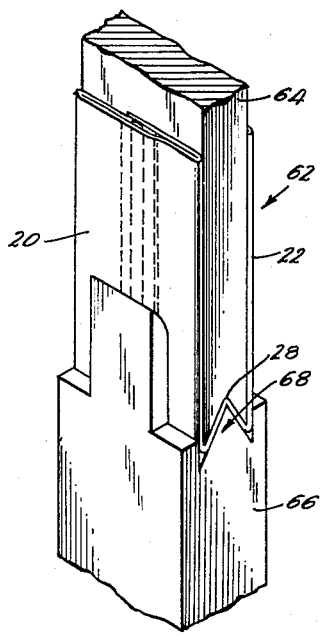
FIG. 3
FIG. 4
INVENTOR.
HANS O. IRMSCHER
BY 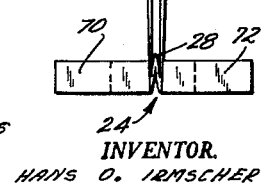
ATTORNEYS

INVENTOR.
HANS O. IRMSCHER

BY James & Franklin

ATTORNEYS

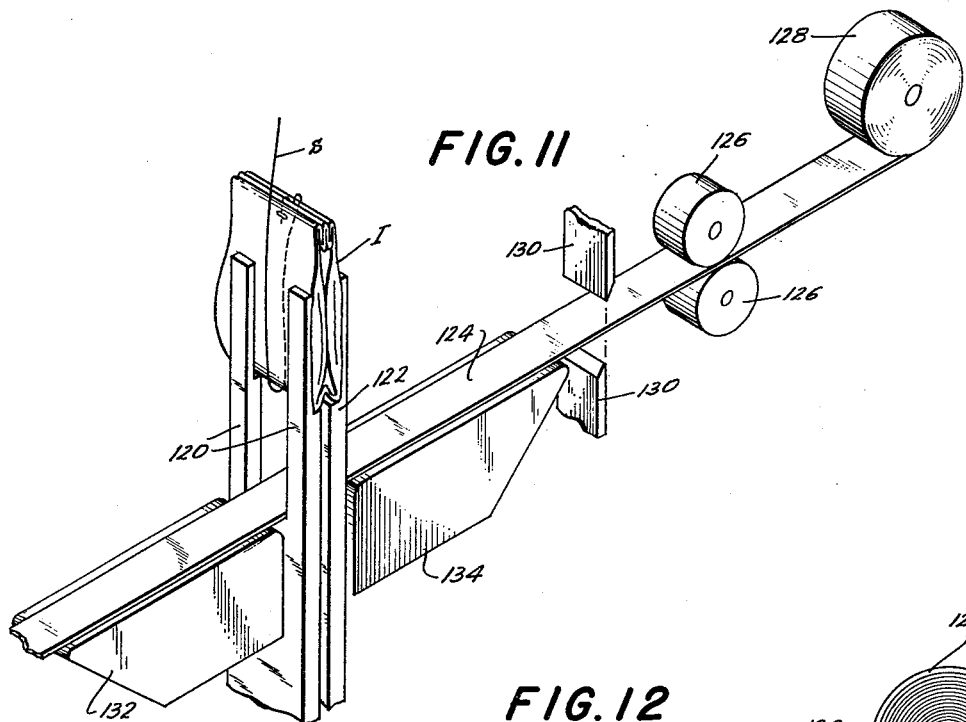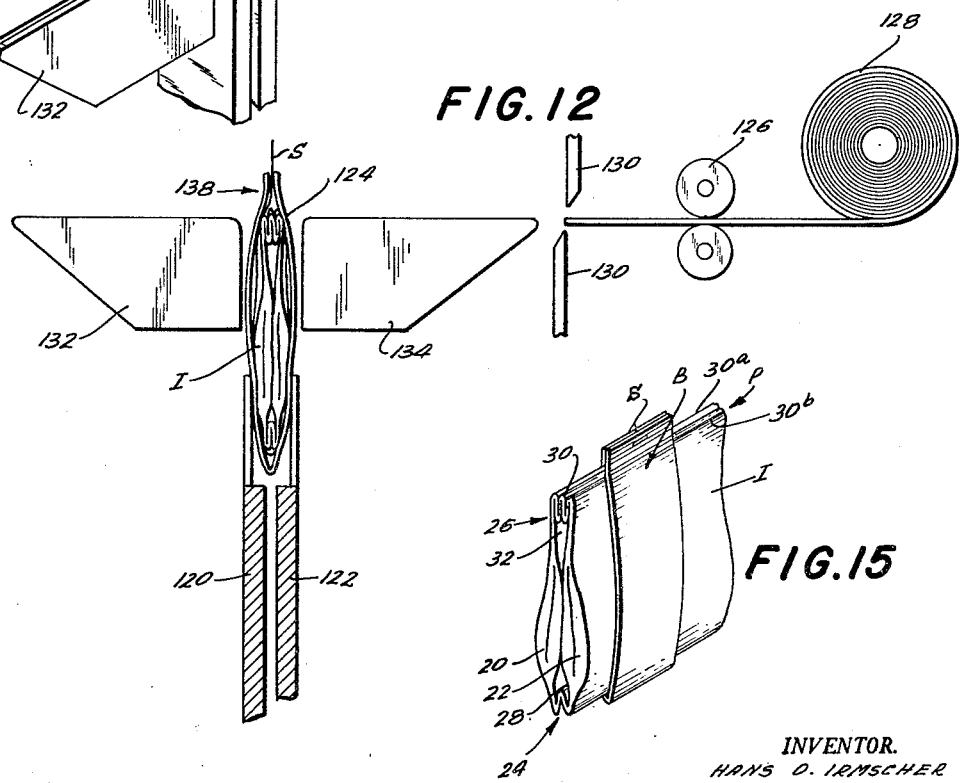

Sept. 11, 1962  H. O. IRMSCHER  3,053,665
MANUFACTURE OF INFUSION BAGS
Filed Aug. 23, 1957  4 Sheets-Sheet 4
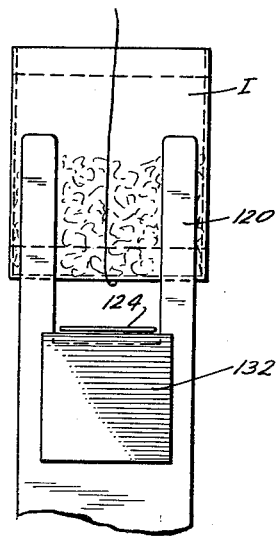
FIG.13
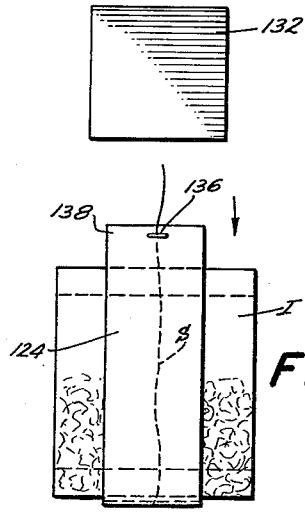
FIG.14
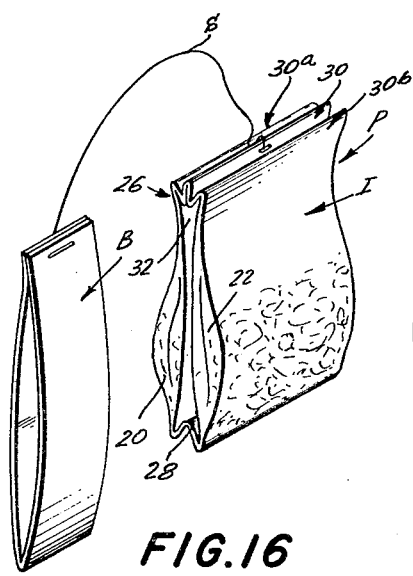
FIG.16
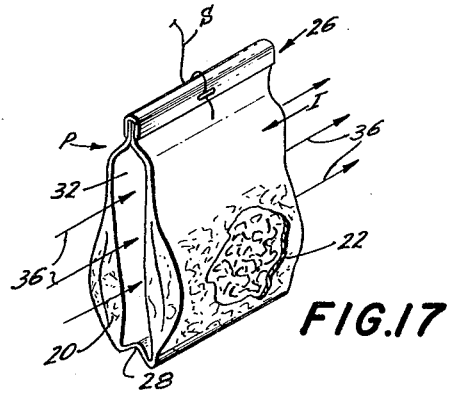
FIG.17
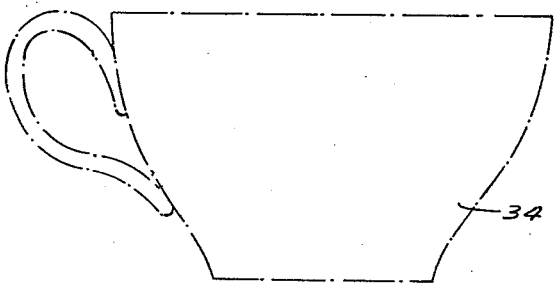
INVENTOR.
HANS O. IRMSCHER
ATTORNEYS

United States Patent Office 3,053,665
Patented Sept. 11, 1962

1

3,053,665
MANUFACTURE OF INFUSION BAGS
Hans O. Irmscher, Uniondale, N.Y., assignor to National Tea Packing Company, Inc., Long Island City, N.Y., a corporation of New York
Filed Aug. 23, 1957, Ser. No. 679,831
12 Claims. (Cl. 99—77.1)

This invention relates to the manufacture of infusion bags such as tea bags and packages.

The prime object of my present invention centers about the provision of an infusion bag and package of the two-compartment bag type, constructed and designed to permit expansion separation of the compartments of the bag as well as expansion or swelling of the infusion product in the compartments, as and when the bag is inserted in a steeping liquid, for quick and efficient brewing of the infusion product.

In known two-compartment infusion, such as tea bags, the brewing of the infusion product is improved by forming the bag into two divided, transversely spaced, compartments so that the bag surfaces subjected to the steeping liquid are multiplied, with the added purpose that the liquid be permitted to flow through the dividing space to speed the infusion process. In the steeping step, however, the infusion product itself quickly swells and expands volumetrically, thereby closing up the dividing space and substantially preventing proper flow-through infusion from taking place. In the improved two-compartment infusion bag of the present invention, the bag is so constructed that a complete expansion separation of the compartments, with a full dividing space, is produced as and when the bag is readied for steeping insertion in the brewing liquid, and an unimpeded flow of the steeping liquid through the dividing space is made possible even with the volumetric expansion or swelling of the infusion product taking place.

A further prime object of the present invention relates to an infusion package of the two-compartment bag type in which the package is provided with a band enclosing the bag proper and functioning to maintain the bag in a flattened state and to stiffen or rigidify the bag for handling, storage and box-packaging use and serving as a hand-hold for the bag during the steeping or brewing step.

Further prime objects of the invention relate to improved methods of making such infusion bags, charging the same with their infusion contents and manufacturing the complete infusion packages.

To the accomplishment of the foregoing objects and such other objects as may hereinafter appear, my invention relates to the manufacture of infusion bags as sought to be defined in the appended claims taken together with the following specification and the accompanying drawings in which:

FIG. 1 is a perspective view showing mechanism used in the first step, namely the forming of a tube from sheet material in the process of making the infusion bags of the present invention;

FIG. 2 is a fragmentary view taken on an enlarged scale of the mechanism shown in FIG. 1 taken in the plane of the line 2—2 of FIG. 1;

FIG. 3 is a perspective view depicting the next step of the bag making process, namely the folding of a formed tube to provide a two-compartment bag and the infolding of the bag bottom to provide a bottom expansion pleat;

FIG. 4 is a composite view in perspective depicting the next step of the bag making process preparatory to opening the bag compartments for charging the same with the infusion product;

FIG. 5 is a front elevational view of the next step of the process depicting the manner of opening the bag compartments for charging the same with the infusion product;

FIG. 11 is a perspective view of apparatus used in the initial steps of enclosing the bag with an encircling band;

FIG. 12 is a side elevational view showing the apparatus of FIG. 11 in a subsequent step of the process;

FIG. 13 is an end view of the apparatus as shown in FIG. 11;

FIG. 14 is an end view of the apparatus shown in FIG. 12 at a succeeding step of the process wherein the free end of the string is attached as by stapling to the mating edges of the band strip;

FIG. 15 is a perspective view of the completed package made in the process;

FIG. 16 is a view depicting the removal of the band, used as a hand-hold, in the step of using the bag for steeping insertion into the brewing liquid; and FIG. 17 is a perspective view showing the condition assumed by the compartments of the bag just prior to inserting the bag into a steeping liquid.

Figure 6:
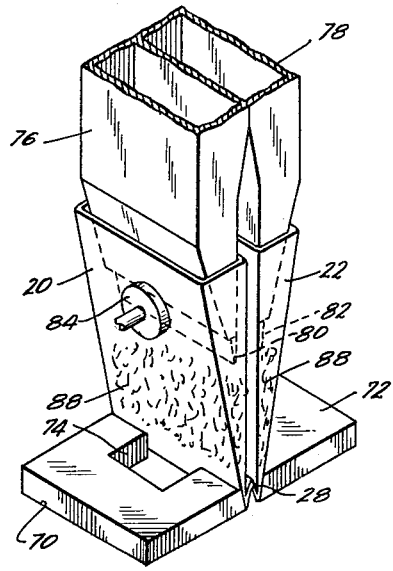
FIG. 6 is a perspective view showing the apparatus of FIG. 5 in the next step of the process wherein the two compartments of the bag are charged with the infusion product.

Referring now more in detail to the drawings, reference may be had first to FIGS. 15 to 17 of the drawings which depict the improved infusion bag and package of the present invention and the characteristics of the same for handling the same in the manufacturing stages ready for storing and box-packaging, and for handling the same during a consumer use. The infusion package P comprises an infusion bag I of the two-compartment type, especially constructed in a manner to be presently detailed, the said bag being held by an enclosing band B, a string S having one of its ends attached, as being stapled to the top of the bag I, and the other end attached as being stapled to the meeting edges of the band B.

The infusion bag I is of the two-compartment type, namely a bag having two divided, transversely spaced compartments 20 and 22, each charged (partly filled) with an infusion product such as tea (or coffee and the like), the said compartments being produced or formed by first forming a tube of sheet material and folding said tube at its bottom 24 and then uniting and closing the compartments at the bag top 26. As shown in FIG. 15, the band B serves to hold the bag I in a substantially flat condition (the compartments of the bag being here shown in a more expanded condition than is normally the case), and to stiffen and rigidify the bag (which latter being made of a light weight filter material is relatively flimsy in character) so that the package may be better handled for storage and box-packaging use. When the tea bag is ready for consumption, the band B may be quickly slipped off the bag I and, together with the string S, used as a hand-hold for the bag in the steeping step as will be apparent by viewing FIG. 16 of the drawings.

The infusion bag I itself is constructed and designed, as heretofore indicated, so that a complete expansion separation of the compartments 20 and 22 with a full dividing space therebetween, is produced as and when the bag is readied for steeping insertion in the brewing liquid, and an unimpeded flow of the steeping liquid through the dividing space is made possible even with the volumetric expansion or swelling that takes place of the infusion product. This is accomplished by infolding the bottom of the bag I so as to produce a bag bottom expansion pleat 28 and by infolding the top of the bag and producing a bag top expansion pleat 30. The top expansion pleat is preferably formed by insetting the bag top and forming a plurality of folds and thereby providing two bag top expansion pleats 30$^a$ and 30$^b$, one on each side of that part of the bag top to which the string S is attached (see particularly FIG. 16). With this construction, when the band B is removed from the bag I, the bottom pleat of the bag 28 opens or expands under the influence of the movement of the infusion bag contents and the top pleat 30 opens and expands under the influence of the pull string S, thus opening up the space 32 which divides the compartments; and under these continuing influences, as the bag is readied to be inserted into the steeping fluid, as for example in a cup 34 of hot water, the compartments 20 and 22 separate still further and more fully open up the dividing space 32, as best shown in FIG. 17 of the drawings, thereby in the steeped or brewing condition of the tea bag, adequate space is afforded for the volumetric expansion or swelling of the infusion product and the space 32 is also opened sufficiently to permit an unimpeded flow of the stepping liquid through the space 32 in the manner shown by the flow arrows 36, 36 (FIG. 17).

In FIGS. 1 to 14 of the drawings are shown the steps of the method and the equipment employed in these steps for making the infusion bag, filling the same with the infusion contents and producing the complete package described. In the first step of this method (FIGS. 1 and 2), infusion material such as filter paper of adequate wet strength is fed in web or sheet form from a roll 38 over a guide 40 and on to a former 42 (cylindrical at one end and tapering to elliptical formation at the other end) about which the web or sheet is wrapped with the rims or edges moving into overlapping condition to form a tube 44 which is fed forward and flattened by the feed rolls 46. The overlapping edges or rims are sealed together by means of a thermoplastic strip 48 drawn from a reel 50 and which is fed between the plies of the overlapping rims, the sealing being effected by means of the heated pressure roller 52, the thermoplastic sealing which results being best shown as at 54 in FIG. 2; thereby is produced a flattened tube 56 of sheet material (filter paper) longitudinally sealed midway the sides thereof as at 54 (FIG. 1). Suitable lengths of such flat tubing for the making of individual tea bags are cut by means of the knives 58 and 60.

In the next step of the process, the cut or severed lengths of the flat tubing such as 62 are passed between the male and female forming tools 64 and 66 thereby folding the said tubing and producing an embryo bag having the compartments 20 and 22. The mating tools 64 and 66 are also so formed at 68 as to infold the bottom of the embryo bag thereby producing the bottom expansion pleat 28. As the forming tools 64 and 66 are withdrawn the bag bottom, including the formed pleat 28, is gripped and clasped between clamping plates 70 and 72 suitably orificed as at 74 for a purpose later to appear, as shown in FIG. 4 of the drawings.

With the embryo bag thus gripped or held at its bottom, the tops of the compartments 20 and 22 are opened and charged with the infusion product; this is accomplished as depicted in FIGS. 5 and 6 of the drawings by the downward movement of spouts or chutes 76 and 78 formed at their bottom with the blades and stops 80 and 82 and by the coordinate operation of the air suction cups 84 and 86. The blades 80 and 82 move into the upper open ends of the compartments 20 and 22, hold the same in position as the suction cups 84 and 86 engage the outer sides of the compartments and move the same from the FIG. 5 to the FIG. 6 open position, after which the tea spouts 76 and 78 continue their descent into the bag compartments 20 and 22 as shown in FIG. 6 of the drawings. The bag compartments are then charged (partly filled) with the infusion contents 88.

Figure 7:
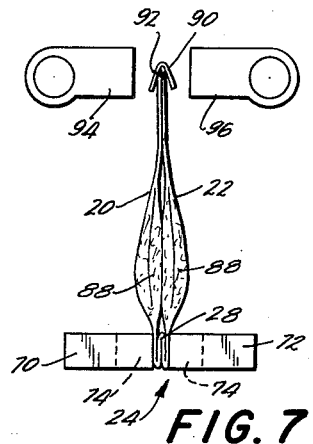
FIG. 7 is a side elevational view depicting the next step of the process, namely the uniting of the tops of the compartments and closing the top of the bag.
Figure 8:
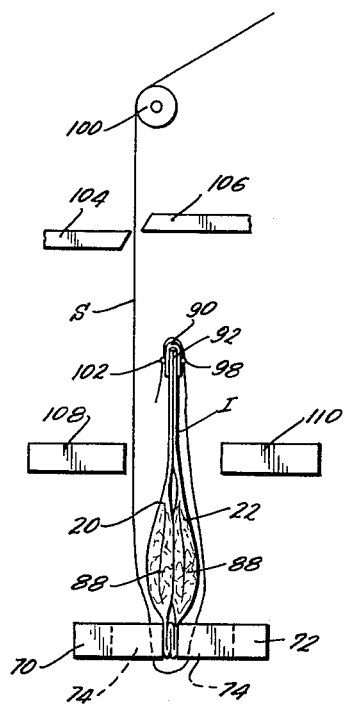
FIG. 8 is a view depicting the next step of the process, namely the attachment of a holding string to the top of the bag.

In the next step of the process the tops of the compartments 20 and 22 are brought together and united and preferably sealed to form the bag top, this while the bag bottom 24 is still gripped or held between the clamping tools 70 and 72. Where the bag top is to be sealed, a thermoplastic strip 90 of suitable cut length is inversely folded as shown in FIG. 7 over the united compartment ends now forming the bag top 92, and this is clamped between the heating tools 94 and 96. In the next step of the operation an end 98 of a string S fed from a spool (not shown) over a guide roll 100 is fed or moved through the openings 74, 74 in the clamping plate 70 and 72 and about the now formed bag I and is attached by means of a staple 102 to the bag top 92, after which the string is cut by means of the blades 104 and 106, as best shown in FIG. 8 of the drawings.

Figure 9:
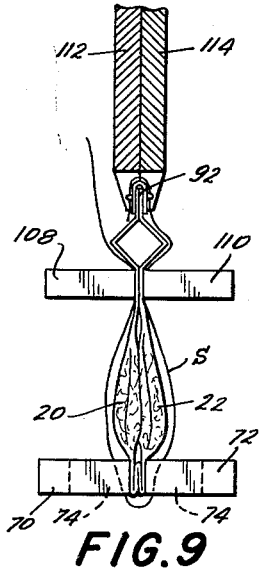
FIGS. 9 and 10 are views depicting sequential steps in the forming of top expansion pleats for the bag.
Figure 10:
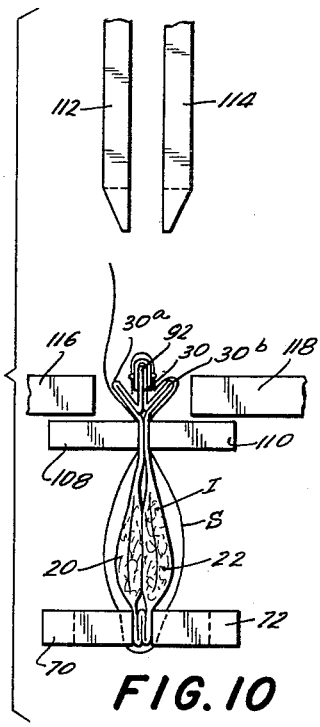

In the next step of the process the top expansion pleat formation, with preferably the two expansion pleats referred to, is produced. This is accomplished as shown in FIGS. 9 and 10 of the drawings by moving into position two clamp plates 108 and 110 and by then engaging the sealed and string attached bag top 92 by and between the fingers 112 and 114 which in their descent move the top section of the bag lying above that locked by the clamping plates 108 and 110 into positions from that shown in FIG. 8 through that shown in FIG. 9 and to that shown in FIG. 10, in which last position the bag top 92 is inset, thereby forming the central pleat portion 30 and the two expansion pleats 30$^a$ and 30$^b$, one on each side of the central portion 30. The top expansion pleats thus formed are the contracted and compacted by means of the clamping tools 116 and 118.

In the succeeding steps of the method of the present invention the infusion bag I is supplied with its wraparound band B. This is done in process steps employing the apparatus shown in FIGS. 11 to 14 of the drawings. The bag I as produced in the method steps of FIGS. 1 to 10 of the drawings is gripped and held between the forked members 120 and 122 and is moved from a position as shown in FIGS. 11 and 13 through a position as shown in FIG. 12 and finally to a position as shown in FIG. 14, the bag I being moved on to a length of a strip 124 fed by means of rollers 126 from reel 128 and severed by the cutting blades 130. The bag I and the severed strip 124 are moved between blocks 132 and 134, which latter serve to fold the strip 124 and enfold the bag I in the manner depicted in FIG. 12 of the drawings. In the further descent of the bag I as shown in FIG. 14 of the drawings, the free end of the string S is stapled as at 136 to the meeting edges 138 of the folded strip 124 thereby completing the making of the encircling band B. The material of the band B, preferably paper of heavier stock than the material of the infusion bag, may carry suitable legends designating the make and quality of the infusion bag contents.

The manner of making the infusion bag of the present invention as well as the completed package, the economies in manufacture afforded by the method steps described, the improved infusion bag and package produced, and the various advantages in the method and in the products resulting therefrom will in the main be fully apparent from the above detailed description thereof. It will be further apparent that many changes may be made in the step sequence of the methods and in the design or form of the infusion bag and the infusion package without departing from the spirit and principles of the invention as defined in the following claims.

I claim:
1. The method of making an infusion bag which consists in forming a tube from sheet material, folding said tube to provide a two-compartment bag, infolding the bag bottom and thereby forming a bottom expansion pleat, charging both compartments with an infusion product, closing the bag top, attaching a string thereto, and then infolding the string attached bag top and thereby forming a top expansion pleat.

2. The method of making an infusion bag which consists in forming a tube from sheet material, folding said tube to provide a two-compartment bag, infolding the bag bottom and thereby forming a bottom expansion pleat, charging both compartments with an infusion product, closing the bag top, attaching a string to the top edge thereof, and then insetting the string attached bag top edge to form two expansion pleats, one on each side of said string attached edge.

3. The method of making an infusion bag which consists in forming a tube from sheet material, folding said tube to provide a two-compartment bag, infolding the bag bottom and thereby forming a bottom expansion pleat, charging both compartments with an infusion product, closing the bag top, attaching one end of a string thereto, then infolding the string attached bag top and thereby forming a top expansion pleat, then wrapping a strip of sheet material about the bag to form a bag enclosing band, and attaching the other end of the string to the meeting edges of band strip.

4. The method of claim 3 in which the band strip is wrapped longitudinally of the bag and the string attached edges thereof surmount the bag top.

5. The method of making an infusion bag which consists in forming a tube from sheet material, folding said tube to provide a two-compartment bag, infolding the bag bottom and thereby forming a bottom expansion pleat, charging both compartments with an infusion product, closing the bag top, attaching one end of a string to the top edge thereof, then infolding the string attached bag top edge to form two expansion pleats, one on each side of said string attached edge, then wrapping a strip of sheet material about the bag to form a bag enclosing band, and attaching the other end of the string to the meeting edges of band strip.

6. The method of making an infusion bag which consists in forming a tube from sheet material, folding said tube to provide a two-compartment bag, infolding the bag bottom and thereby forming a bottom expansion pleat, holding the bag at said pleated bottom and opening the tops of the compartments, charging both opened compartments with an infusion product, uniting the tops of the compartments and closing the thus formed bag top, stapling a string to the bag top, and then infolding the bag top and thereby forming a top expansion pleat.

7. The method of claim 6 in which the stapled bag top is inset to form two expansion pleats, one on each side of the stapled bag top.

8. The method of making an infusion bag which consists in forming a tube from sheet material, folding said tube to provide a two-compartment bag, infolding the bag bottom and thereby forming a bottom expansion pleat, holding the bag at said pleated bottom and opening the tops of the compartments, charging both opened compartments with an infusion product, uniting the tops of the compartments and closing the thus formed bag top, stapling one end of a string to the bag top, then infolding the string stapled bag top and thereby forming a top expansion pleat, then wrapping a string of sheet material about the bag to form a bag enclosing band, and stapling the other end of the string to the meeting edges of band strip.

9. An infusion bag comprising a tube of sheet material, said tube being folded to form a two-compartment bag, the bottom of the bag being infolded providing a bag bottom expansion pleat, the said two compartments being charged with an infusion material, means uniting the tops of the compartments thereby providing the bag top, a string attached to the bag top, and the said sring attached bag top being infolded and providing a bag top expansion pleat.

10. An infusion bag comprising a tube of sheet material, said tube being folded to form a two-compartment bag, the bottom of the bag being infolded providing a bag bottom expansion pleat, the said two compartments being charged with an infusion material, means uniting the tops of the compartments thereby providing the bag top, a string attached to the bag top, and the said string attached bag top being inset and forming a plurality of folds and thereby providing two bag top expansion pleats, one on each side of the string attached bag top.

11. An infusion bag comprising a tube of sheet material, said tube being folded to form a two-compartment bag, the bottom of the bag being infolded providing a bag bottom expansion pleat, the said two compartments being charged with an infusion material, means uniting the tops of the compartments thereby providing the bag top, one end of a string attached to the bag top, the said string attached bag top being infolded and providing a bag top expansion pleat, a band of strip material wrapped about the bag, the other end of the string being attached to the meeting edges of the band strip.

12. The infusion bag of claim 11 in which the band is wrapped longitudinally about the bag and the string attached edges of the band surmount the string attached bag top.

References Cited in the file of this patent

UNITED STATES PATENTS

| | | |
|---|---|---|
| 2,146,753 | Luckhaupt | Feb. 14, 1939 |
| 2,565,444 | Waters | Aug. 21, 1951 |
| 2,593,608 | Rambold | Apr. 22, 1952 |